Nov. 25, 1958 — E. H. CASE — 2,861,849

SEPARATOR FOR ANTIFRICTION BEARINGS

Filed April 4, 1956

INVENTOR:
EDMUND H. CASE
by Edward H. Goodrich,
HIS ATTORNEY.

2,861,849

SEPARATOR FOR ANTIFRICTION BEARINGS

Edmund H. Case, Dallas, Tex., assignor to General Motors Corporation, Detroit, Mich., a corporation of Delaware Application April 4, 1956, Serial No. 576,156

3 Claims. (Cl. 308—201)

The present invention relates to improved means for fastening multi-part bearing separators or cages. More particularly, the invention pertains to securing means which are formed integrally with the parts of the separator thus obviating the need for separate securing devices.

It has been a continuing problem to the bearing industry to provide means for assembling the separators that were both cheap and effective. It is believed that these requirements are better served by the present invention than has heretofore been possible with presently known separator fastening devices.

The present bearing separator preferably utilizes a material having an inherent resiliency such as is found in many plastics, although metals and natural or synthetic fiber materials are also comprehended as a separator material. The use of a resilient material in conjunction with the present novel fastening device has resulted in a separator which is fabricated by simply snapping the separator components together.

In the past, the assembly of split type separators has necessitated the use of non-identical separator halves or separate fastening means.

It is an object of this invention to provide an improved separator having interchangeable parts that may be easily secured in interlocking assembly.

Another object is to provide an improved antifriction bearing separator having interchangeable halves that may be snapped into assembled relation.

It is a further object to provide an improved separator of simple construction and which may be easily formed by molded members that may be snapped into interfitting assembled relation with each other.

To these ends and also to improve generally upon devices of this character, the invention consists in the various matters hereinafter described and claimed. In its broader aspects, the invention is not necessarily limited to the specific structures selected for illustrative purposes in the accompanying drawings wherein Figure 1 is a partially sectioned elevational view of an assembled separator.

Figures 1, 2:
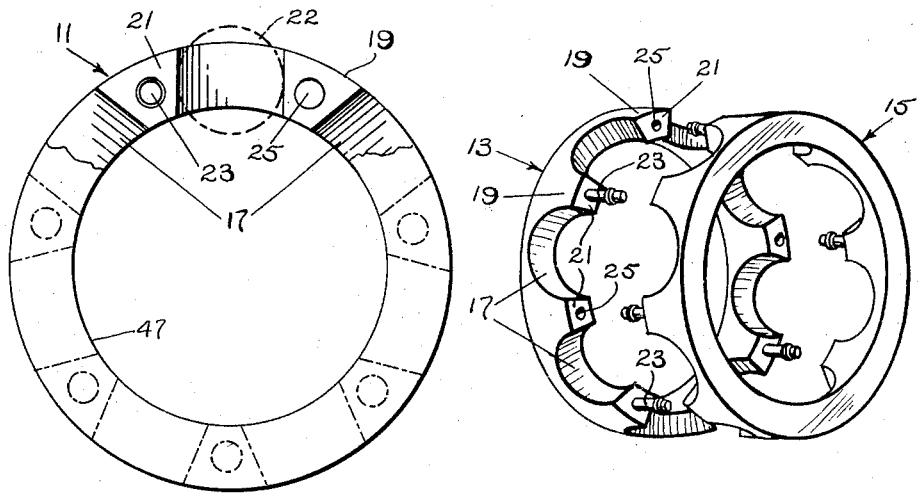
Figure 2 is a view of a disassembled separator utilizing the novel fastening device.

Referring to the drawings, a bearing separator is shown generally at 11 and includes annular members 13 and 15 which are adapted to be fastened together to provide the integrated separator.

The annular members 13 and 15 are of identical construction; therefore, it will suffice to merely describe one of the members in detail.

Annular member 13 includes a plurality of circumferentially spaced radially extending open ended pockets 17, preferably parti-cylindrical in form. By thus spacing the pockets 17, it is intended to provide a plurality of axially extending shoulders 19 intermediate adjacent pockets.

Shoulders 19 include radially flat portions 21 adapted to abuttingly engage with corresponding portions on cooperating and oppositely disposed shoulder members. When the annular members 13 and 15 are assembled with the corresponding flat portions 21 in abutting engagement, the parti-cylindrical portions 17 will each cooperatively form a cylindrical pocket for receiving and guiding a rolling element such as a ball 22 for rolling engagement within the raceways of a ball bearing. As will be best seen in Figures 2 and 3, alternate shoulders 19 are formed with studs 23 axially projecting therefrom. The remaining alternate shoulders have recesses 25 formed therein for matingly and detachably receiving studs on the other separator member 15. As a result of this arrangement each annular member will be constructed so that alternate shoulders will respectively have a stud and a recess associated therewith.

"Alternate" as used with reference to the studs and recesses on shoulders 19 does not limit the construction of the annular members 13 or 15 to a construction which has either a stud or a recess on every shoulder. For instance, in the event there is an odd number of shoulders, a stud may be omitted from at least one of these shoulders. In this way a like number of studs and recesses are provided on each of the annular members 13 and 15. If this were not done, it would be necessary to provide two lots of annular members, in one of which lots the number of studs exceeded the recesses and the other lot in which the recesses exceeded the studs with the consequent problem of sorting separator halves prior to assembly.

For greater ease of manufacture and assembly, the annular members 13 and 15 are preferably composed of a material which may be formed in a simple molding operation under the influence of heat and pressure. Such material may include various plastic materials which are resiliently yieldable and which will not be detrimentally effected by heat, light or bearing lubricants and which have a low coefficient of friction when in contact with a rotated metal surface such as a bearing member or the annular wall of a race ring. A synthetic polymeric amide, commonly referred to as "nylon" and a polymeric tetrafluoroethylene, commonly known as "Teflon" are examples of some materials which have been found to be well-suited for use with the subject bearing separator fastening means.

Figure 3:
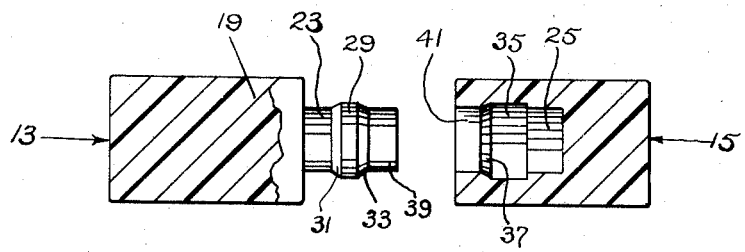
Figure 3 is an enlarged view of the fastening means.

A preferred form of separator fastening means including studs 23 and bores 25 is best illustrated in Figure 3. The stud member 23 includes an enlarged portion disposed intermediate the ends of the shank. The enlarged portion is comprised of a concentric portion 29 flanked by converging frusto-conical walls 31 and 33. Correspondingly, each bore 25 has intermediate its ends an enlarged annular recess 35, connected to the bore 25 by at least one frusto-conical wall 37. The stud 23 and the enlarged portion 29—31—33 thereof correspond generally in diametrical size to the bore 25 and to the intermediate recess 35.

It is apparent that the shape of the enlargement 29—31—33 and recess 35 may be arcuate or any other convenient form that will provide a suitable locking relationship.

The geometrical shape of the stud and recess enlargements is further limited to a form in which the axially extreme edges are of an inclination which permits axial insertion and retraction of the stud relative to the bore 25. In the form of locking means illustrated, the edges 31 and 33 of the shank enlargement are tapered to facilitate ingress and egress within the relatively smaller mouth of the bore 25.

It is to be noted that only the outer end 37 of the recess 35 is necessarily tapered and this to permit withdrawal of the stud for disassembly of the separator. The slightly resilient character of the material from which the annular members are formed permits the enlargements on each stud 23 to be snapped into and out of locking engagement within the corresponding recesses 35 and to firmly hold the separator members 13 and 15 in assembled relation.

The axes of the studs 23 and corresponding bores 25 are parallel and radially equidistant from the center of the annular members. This parallel axes relationship is consistent with the desire that the studs and recesses be adapted to be moved axially relative to each other for purposes of assembly and further that the separator components 13 and 15 be identical for complete interchangeability.

The bores 25 have been shown as only partially extending through the annular members 13 and 15. It is to be understood, however, that, if desirable for reasons of manufacturing convenience, the recesses may extend completely through the member.

With the studs and bores formed as shown it will be seen that a portion 39 of each stud which extends outwardly from the enlarged portion 29—31—33 provides a pilot whereby the stud will be guided into the recess for alignment and reinforcing purposes prior to the insertion of the enlarged portion, preventing buckling of the stud. Further insertion of the shank into the recess will result in a resilient radial deformation of both the enlarged portion of the stud and the mouth 41 of the bore 25. When the stud is fully inserted, the enlarged portion of the shank will be disposed within the recess portion 35 permitting both the distended enlarged portion and the recess mouth to return to their normal sizes. Thus, the frusto-conical shoulders 31 and 37 of the stud and the counterbore will be in abutting engagement locking the stud against withdrawal from the recess and thus holding the annular members in engagement.

By providing a fastening device utilizing the alternate stud and recess arrangement as described, the annular members 13 and 15 are identical so that any two annular members may be combined to form a unitary bearing separator. This arrangement thus represents a distinct improvement over many of the prior devices in which, as has been noted, the separator parts are either of different configuration relative to each other, and hence not interchangeable, or separate connecting means had to be provided for fastening the separator components together.

Figure 4:
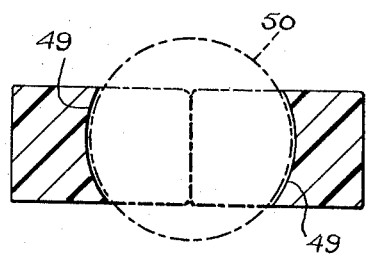
Figure 4 shows a modified form of bearing retaining pocket.

It will be noted in Figure 1 that with the annular members 13 and 15 assembled, the side walls of pockets 17 are cylindrical in radial cross section. In using bearing pockets of such a cylindrical configuration, the separator will receive no radial support from the rolling elements 22 but rather will be supported along its inner periphery 47 upon an inner race member not shown.

Where it is desired to have the separator radially spaced between the inner and outer bearing races, it is possible to have the ball pocket side walls 49 generally parti-spherical as shown in Figure 4. In this way the separator will be radially supported by the balls 50.

I claim:

1. A separator comprising a pair of annular members adapted to be detachably engaged to form a unitary guide for a plurality of rolling elements, each member having a plurality of axially opening arcuate pockets formed therein, said pockets being circumferentially spaced and providing an axially extending shoulder between each pair of adjacent pockets, a stud respectively formed on and axially projecting from each of a plurality of said shoulders, each of a plurality of said shoulders having a stud-receiving recess, said studs and recesses being respectively disposed in an alternate sequence upon said shoulders, each stud including an enlarged portion intermediate the ends thereof, each recess including an enlarged portion intermediate the ends thereof adapted to matingly and demountably receive the enlarged portion of a corresponding stud when the annular members are in assembled relation, and a pilot portion on each stud to aid in assembly of said annular members.

2. A separator as defined in claim 1 in which the enlarged stud portion includes a cylindrical section concentric with said stud and an adjacent frusto-conical portion, and in which the enlarged portion of the recess is formed at one end with a frusto-conical shoulder adapted to coact with the frusto-conical portion on said stud.

3. A separator as defined in claim 1 wherein the enlarged stud portion includes a cylindrical section concentric with said stud and a frusto-conical portion at each end of said cylindrical section, and in which the enlarged portion of said recess is formed at one end with a conical shoulder arranged to interfit with one of said frusto-conical portions.

References Cited in the file of this patent

UNITED STATES PATENTS

| | | |
|---|---|---|
| 2,665,958 | Waldherr | Jan. 12, 1954 |

FOREIGN PATENTS

| | | |
|---|---|---|
| 67,296 | Switzerland | Jan. 14, 1914 |
| 621,404 | Great Britain | Apr. 8, 1949 |